US010212624B1

(12) United States Patent
Padgett

(10) Patent No.: US 10,212,624 B1
(45) Date of Patent: Feb. 19, 2019

(54) SYSTEMS AND METHODS FOR RUNNING NETWORK EGRESS LINKS WITH SMALL BUFFERS AT A HIGH UTILIZATION

(71) Applicant: Google LLC, Mountain View, CA (US)

(72) Inventor: Steven Padgett, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 289 days.

(21) Appl. No.: 14/274,695

(22) Filed: May 10, 2014

(51) Int. Cl.
*H04W 28/08* (2009.01)

(52) U.S. Cl.
CPC ................................. *H04W 28/08* (2013.01)

(58) Field of Classification Search
CPC ..................................................... H04W 28/08
USPC .......................................................... 370/235
See application file for complete search history.

(56) References Cited

U.S. PATENT DOCUMENTS

| | | | |
|---|---|---|---|
| 7,693,093 B2 | 4/2010 | Riedel et al. | |
| 7,802,008 B2 | 9/2010 | Akinlar et al. | |
| 2003/0035385 A1* | 2/2003 | Walsh | H04B 7/18586 370/316 |
| 2006/0029037 A1* | 2/2006 | Chen | H04L 29/06027 370/351 |
| 2008/0002656 A1* | 1/2008 | Lundh | H04L 47/10 370/342 |
| 2009/0016217 A1* | 1/2009 | Kashyap | H04L 47/2408 370/231 |
| 2009/0063698 A1 | 3/2009 | Xu et al. | |
| 2010/0005171 A1 | 1/2010 | Arolovitch | |
| 2011/0228794 A1* | 9/2011 | Yong | H04L 1/1809 370/412 |
| 2012/0314593 A1* | 12/2012 | Liu | H04L 47/18 370/252 |
| 2012/0321052 A1* | 12/2012 | Morrill | H04L 29/06027 379/32.01 |
| 2013/0094356 A1* | 4/2013 | Keith | H04L 47/2433 370/229 |

(Continued)

OTHER PUBLICATIONS

End-to-End QoS Network Design, by Tim Szigeti, Christina Hattingh, Robert Barton, Kenneth Briley, Jr.; copy right @2014 Cisco Systems Inc, First Printing: Nov. 2013 (Year: 2013).*

(Continued)

*Primary Examiner* — Benjamin Lamont
*Assistant Examiner* — Nizam U Ahmed
(74) *Attorney, Agent, or Firm* — McDermott Will & Emery LLP

(57) ABSTRACT

Methods and systems for managing packet flow in a local network in a manner that allows network devices at the edge of the network to use minimal buffer memory while maximizing use of bandwidth allocated on an interconnect between the local network and an external network. Packet flows facing external network problems are scaled back, reducing redundant traffic on the interconnect and allowing for use of small buffers in edge devices. A flow source marks a subset of packets within a flow for preferential treatment within the local network. The flow source then adjusts the flow rate only responsive to failures in transmission of the marked packets. In some implementations, an edge device removes the markings prior to packet egress. The local network honors the preferential treatment markings such that a loss of a marked packet is more likely to occur on an external network than on the local network.

20 Claims, 4 Drawing Sheets

(56) References Cited

U.S. PATENT DOCUMENTS

2014/0250486 A1* 9/2014 Sze .................. H04W 76/15
                                                725/127

OTHER PUBLICATIONS

Diffserv—The Scalable End-To-End Quality of Service Model, Last Updated: Aug. 2005, Cisco Systems (Year: 2005).*
Clark, David D., Scott Shenker, and Lixia Zhang. Supporting real-time applications in an integrated services packet network: Architecture and mechanism vol. 22, No. 4, pp. 14-26. ACM, 1992 URL: http://dspace.mit.edu/bitstream/handle/1721.1/1543/csz.pdf-3.pdf?sequence=2.

* cited by examiner

| | 00000000 01234567 | 00111111 89012345 | 11112222 67890123 | 22222233 45678901 |
|---|---|---|---|---|
| 0 | End of New Packet Preamble and Delimiter Bits | | MAC Destination Address (6 Bytes) | |
| 1 | MAC Destination (Continued) | | | |
| 2 | MAC Source Address (6 Bytes) | | | |
| 3 | MAC Source Address (Cont.) | | Ethertype | |
| 4 | IP Ver. | IHL (length) | DSCP (QoS) | ECN | Packet Length | |
| 5 | Identification | | Flags | Fragment Offset |
| 6 | Time to Live (TTL) | Protocol | Header Checksum | |
| 7 | Source IP Address | | | |
| 8 | Destination IP Address | | | |
| 9 | Source Port | | Destination Port | |
| 10 | Sequence Number | | | |
| 11 | Acknowledgment Number | | | |
| 12 | Data Offset | Not Used | Control Flags | Window Size | |
| 13 | Checksum | | Urgent Pointer / Options / Zero Pad | |
| 14 | Begin Data ... | | | |

Figure 3

SYSTEMS AND METHODS FOR RUNNING NETWORK EGRESS LINKS WITH SMALL BUFFERS AT A HIGH UTILIZATION

BACKGROUND

Information is transmitted over computer networks. The information is represented as bits divided into packets. The packets are passed from network device to network device, e.g., switches and routers, propagating the information through the computer networks. Each packet is transmitted from its source to a destination specified by header information in the packets. The source and destination may respectively be in different networks, each controlled by different parties, and the packets may pass through any number of additional networks in between the source and destination.

Throughput is the amount of information, e.g., number of bits, that is transmitted over a link in a fixed period of time. Bandwidth is a maximum potential throughput, where the limitation is either physical or artificial (e.g., policy driven). Goodput is the throughput of information content, exclusive of other traffic such as network configuration data, protocol control information, or repeated transmission of lost packets.

SUMMARY

Disclosed are methods and systems for managing packet flow. A source in a local network generates a flow of packets to a destination in a manner that allows network devices at the edge of the local network to use a reduced buffer memory while maintaining or increasing use of bandwidth allocated on an interconnect between the local network and an external network. The packet flow is managed in a manner that allows for discerning whether a source of a problem with packet transmission within a flow is internal or external to a local network. Packet flows facing external network problems are scaled back, reducing redundant traffic on the interconnect and allowing for use of small buffers in edge devices.

In one aspect, the disclosure relates to a method for managing flows. The method includes transmitting, by a first computing device in a first network, to a second computing device in a second network, a set of network packets in a network flow for an end-to-end network interaction at a pace set according to a flow rate. The set of network packets includes at least a first network packet with a first payload and a second network packet with a second payload, the second network packet marked with a preferential treatment indicator. The method includes determining, by the first computing device, that the first network packet did not reach the second computing device, and without modifying the flow rate, transmitting to the second computing device a third network packet with the first payload. The method includes determining, by the first computing device, that the second network packet did not reach the second computing device, modifying the flow rate responsive to determining that the second network packet did not reach the second computing device, and transmitting, by the first computing device, to the second computing device, a fourth network packet with the second payload. In some implementations, the method includes removing, by an edge device in the first network, the preferential treatment indicator.

In another aspect, the disclosure relates to a system. The system includes a first computing device in a first network configured to transmit, to a second computing device in a second network, a set of network packets in a network flow for an end-to-end network interaction at a pace set according to a flow rate. The set of network packets includes at least a first network packet with a first payload and a second network packet with a second payload, the second network packet marked with a preferential treatment indicator. The first computing device is configured to determine that the first network packet did not reach the second computing device, and without modifying the flow rate, transmit to the second computing device a third network packet with the first payload. The first computing device is configured to determine that the second network packet did not reach the second computing device, modify the flow rate responsive to determining that the second network packet did not reach the second computing device, and transmit, to the second computing device, a fourth network packet with the second payload. In some implementations, the system includes an edge device, at the border of the first network and an external network, the edge device configured to remove the preferential treatment indicator.

BRIEF DESCRIPTION OF THE DRAWINGS

The above and related objects, features, and advantages of the present disclosure will be more fully understood by reference to the following detailed description, when taken in conjunction with the following figures, wherein:

FIG. 3 is the layout for a typical TCP/IPv4 packet header, including the Ethernet frame.

Like reference numbers and designations in the various drawings indicate like elements.

DETAILED DESCRIPTION

Aspects of the disclosure relate to methods and systems for managing packet flow. A source in a local network transmits packets in a manner that allows network devices at the edge of the local network, where the local network meets an external network, to use less buffer memory while continuing to maintain or increase use of bandwidth allocated on an interconnect between the local network and the external network. The packet flow is managed in a manner that allows for discerning whether a source of a problem with packet transmission within a flow is internal or external to the local network. The flow rates for packet flows facing external network problems are scaled back, reducing redundant traffic on the interconnect. This allows other flows to use the allocated interconnect bandwidth and effectively improves overall goodput across the interconnect. Packets lost at the edge network device itself, e.g., due to insufficient buffer memory, do not traverse the interconnect and thus do not consume interconnect bandwidth. The buffer itself only fills when otherwise problem-free flows saturate the interconnect bandwidth. Packets dropped at the edge device due to buffer overflow are resent, burdening only the internal network. This maintains pressure on the interconnect without regard to the edge device's buffer size. Packet flows are scaled back if the pressure becomes excessive to the point that even prioritized packets cannot be reliably transmitted across the interconnect.

Typically, large networks physically interconnect at Internet eXchange Points (IXPs). An IXP is a co-location center that is generally operated by a third-party independent of the operators of the interconnected networks. The IXP maintains an interconnect fabric and provides physical space for customer equipment. Network operators establish a point of presence (POP) at the IXP by leasing the physical space and purchasing bandwidth on the interconnect fabric. The network operators usually provide the network hardware, e.g., edge switches and associated servers, and negotiate permission to exchange data with each other, typically as either a transit agreement billed by usage ("settlement") or as a "settlement-free" mutually-beneficial peering agreement. Regardless of agreements between the network operators, the IXP itself usually charges each network for a fixed amount of bandwidth on the interconnect fabric itself. Accordingly, it is advantageous for a network to utilize the bandwidth provided by the IXP efficiently.

Figure 1:
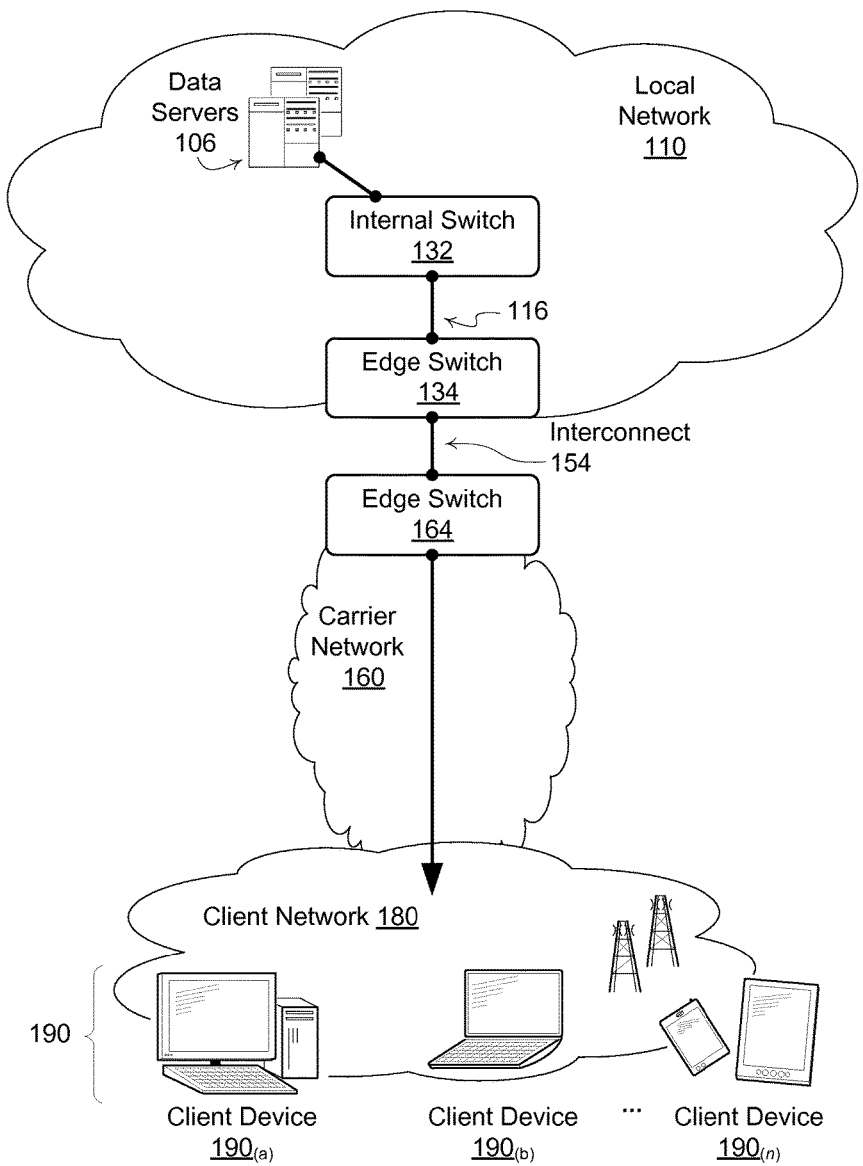
FIG. 1 is a block diagram of an example network.

FIG. 1 is a block diagram of an example network environment made up of multiple independent networks linked together at various interconnect points. As illustrated, a local network 110 connects to a client network 180 via a carrier network 160. The local network connects to the carrier network 160 through an interconnect 154 between an edge switch 134 that is part of the local network 110, and an edge switch 164 that is part of the carrier network 160. The local network 110 includes one or more internal switches 132 and data servers 106. A data server 106 transmits data through the internal switches 132 to the local edge switch 134, across the interconnect 154, and through the carrier network 160 on to one or more client devices 190 in the client network 180.

Figure 4:
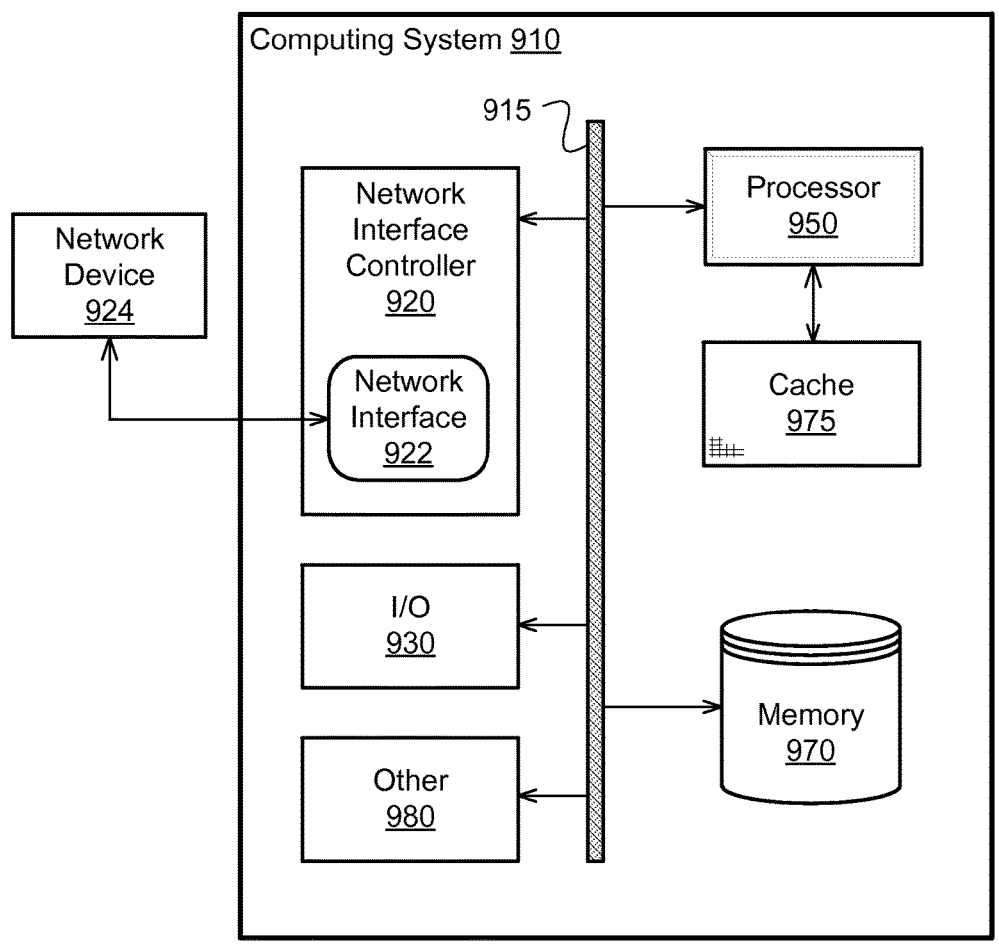
FIG. 4 is a block diagram of a computing system in accordance with an illustrative implementation.

Referring to FIG. 1, in more detail, the local network 110 includes one or more internal switches 132 and one or more data servers 106. A data server 106 is an information source, e.g., a source that originates a flow of packets through the networks. The data servers 106 are linked to internal switches 132, connecting the data servers 106 to edge switches 134 at the edge of the local network 110. For example, the network 110 may be a datacenter with data servers arranged in a hierarchical network of internal switches. In some implementations, each data server 106 is a physical computing device including memory, one or more processors, and a network interface, e.g., as illustrated in FIG. 4. In some implementations, a data server 106 may be a virtual machine. Each data server 106 implements at least one network protocol, e.g., an OSI network-layer protocol such as TCP/IP or SCTP/IP. In some implementations, the local network 110 includes additional network devices, such as hubs, bridges, or routers, connecting the data servers 106 to the internal switches 132 and/or to the edge switch 134. In some implementations, the network 110 is a software-defined network.

The local network 110 includes at least one edge switch 134 that participates in an interconnect 154 with another network, e.g., a carrier network 160. As a packet leaves the local network 110, the edge switch 134 is the last network device controlled by a network operator for the local network 110 before the packet exits the network 110. In some implementations, the edge switch 134 implements routing protocols such as the Border Gateway Protocol (BGP). In some implementations, the edge switch 134 is a computing device 910, as illustrated in FIG. 4.

The local edge switch 134 includes memory dedicated to buffering the flow of packets across the interconnect 154. The interconnect 154 typically has a bandwidth limit. Generally, packets arrive at the edge switch 134 in bursts. When the number of packets arriving at the edge switch 134 exceeds the bandwidth limit, the excess packets are buffered at the edge switch 134 and transmitted across the interconnect 154 as the burst of arriving packets slows or ends. The buffer smooths the usage of the interconnect 154, although some packets experience latency as a result of the buffering. If the buffer is full, i.e., the switch does not have sufficient memory, then some packets are discarded or "dropped." In some implementations, the switch buffer has a large capacity, e.g., in the range of 70 milliseconds to 250 or more milliseconds of traffic. That is, the buffer memory is sufficient to hold an amount of data equivalent to some number of milliseconds of traffic at the maximum bandwidth for the device. For example, a one second buffer on a one gigabit per second device uses one gigabit of memory). A large capacity buffer requires additional memory and consumes more power, which can add expense to the cost of obtaining and operating the switch. In some implementations, a smaller buffer of less than 10 milliseconds of traffic is used. In some implementations, the buffers store as little as about 1.0 millisecond of traffic, 0.5 milliseconds of traffic, 0.2 milliseconds of traffic, or even less.

The interconnect 154 links the edge switch 134 for the local network 110 with edge switches for other networks, e.g., an edge switch 164 for a carrier network 160. Like the local network 110, the carrier network 160 is made up of inter-linked network devices. Each network device of the carrier network 160 is configured to process packets, e.g., to forward packets towards a network destination. In some implementations, the carrier network 160 is controlled by a third-party network operator distinct from the operator of the local network 110. In some implementations, the interconnect 154 is a direct link between a local edge switch 134 and an edge switch 164 for a carrier network 160. In some implementations, the interconnect 154 is an interconnect fabric between multiple networks. In some implementations, the interconnect 154 is operated by a third-party IXP. The IXP may charge each network operator for access to the interconnect 154, and may set limits on bandwidth usage by each network.

The carrier network 160 may further connect to additional networks, e.g., a client network 180 that includes client devices 190 in communication with the data servers 106. For example, the client network 180 may be an Internet Service Provider (ISP) network for a user of a client device 190. In some implementations, the carrier network 160 is, or includes, the client network 180.

The client devices 190 are any computing system capable of receiving packets from the data servers 106. Users receive data from the data server 106 at the client devices 190 via the client network 180. For example, a user of a device 190 may receive a video stream from a data server 106. The client device 190 may be a desktop computer 190a, laptop 190b, or mobile device 190c such as a smart phone or tablet. The client device 190 can be any computing device configured for access to a network.

Figure 2:
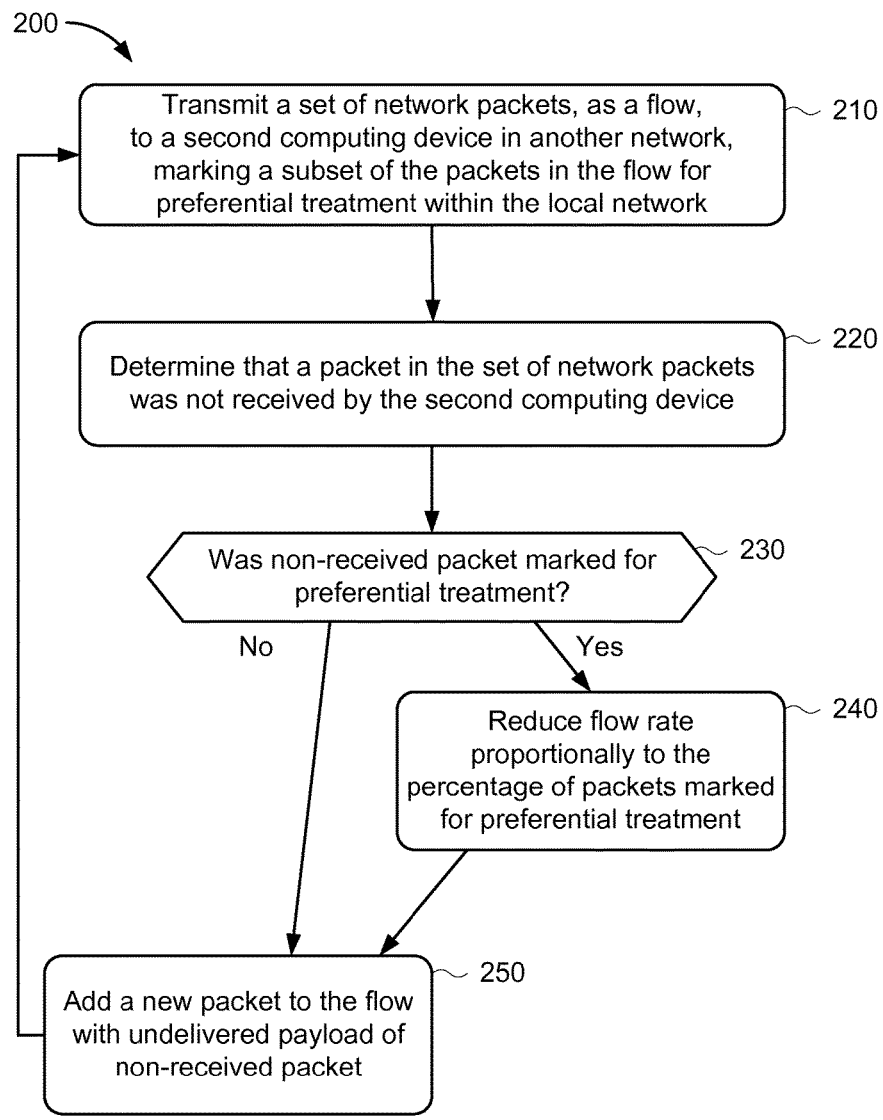
FIG. 2 is a flowchart for a method of transmitting packets through an interconnect at high utilization.

FIG. 2 is a flowchart for a method 200 of transmitting packets through an interconnect at a high utilization. In broad overview of the method 200, a first computing device (a data sender) transmits a set of network packets (i.e., a flow) to a second computing device (a data receiver or client) in another network (stage 210). The sender marks a subset of the packets in the flow for preferential treatment within the sender's local network. The sender subsequently determines that a packet in the set of network packets was not received by the second computing device (stage 220), and determines if the non-received packet had been in the subset of packets marked for preferential treatment (stage 230). If the non-received packet was marked for preferential treatment, the sender reduces the flow rate for sending all of the packets in the flow (stage 240). The sender re-sends the information contained within the non-received packet by adding a new packet to the flow with the undelivered payload of the non-received packet (stage 250), and continues transmitting packets in the flow.

Referring to FIG. 2, in more detail, the method 200 includes a first computing device (a data sender) transmitting a set of network packets (i.e., a flow) to a second computing device (a data receiver or client) in another network (stage 210). The set of network packets is a flow of packets for an end-to-end network interaction. For example, in some implementations, the set of network packets forms a data stream, e.g., a video and/or audio media stream. The flow of packets is transmitted at a pace set according to a flow rate. The flow rate is adjustable, causing the flow of packets to speed up or slow down, e.g., as required by application requirements or network conditions. The client device confirms receipt of the packets in accordance with the particular communication protocol of the flow. For example, in some implementations, the packets in the set of network packets are sent by the first computing device using the Transmission Control Protocol (TCP). In TCP, two networked devices establish a communication channel for exchange of packets. The packets are marked with sequence numbers that are consistently incremented from an initial arbitrarily selected number. A device participating in the channel confirms receipt of one or more packets by providing an acknowledgment (ACK) confirming receipt of all packets up to a particular sequence number. In some implementations, all of the packets in the set of network packets in a flow are sent within a single TCP channel. In some implementations, other communication protocols are used. For example, in some implementations, the Stream Control Transmission Protocol (SCTP) is used. In some such implementations, all of the packets in the set of network packets are sent by the first computer within a single SCTP stream.

A subset of the packets in the flow transmitted in stage 210 are marked by the sender for preferential treatment within the sender's local network. In some implementations, the preferential treatment is preferential over other packets in the same flow. In some implementations, the subset is a percentage of the packets, e.g., ten or twenty percent. The packets that are marked are selected in an arbitrary manner. For example, in some implementations, every fifth packet is marked by the sender for preferential treatment within the local network. In some implementations, the packets are marked for preferential treatment based on a property of a sequence number. For example, in some implementations, packets are marked for preferential treatment when the sequence number, modulo a constant, is zero. In some implementations, the preferential treatment is a quality of service (QoS) flag set in packet header information, e.g., an IPv4 DiffSery bit or an IPv6 Traffic Class bit. A brief overview of QoS flags is described below in relation to FIG. 3. Generally, QoS markings are only expected to be honored within the sender's local network. In some implementations, a network edge switch removes the QoS flags from packets leaving the local network. In some implementations, the entire flow is marked to receive an elevated QoS, and the subset of packets designated for preferential treatment have markings requesting a QoS level that is higher than the other packets of the flow not designated for the particular preferential treatment. In some implementations, only packets of the flow designated for preferential treatment have markings requesting an elevated QoS.

Referring back to FIG. 1, as an example, a data server 106 may act as the sender. The sender 106 transmits packets to a client device 190 through the local network 110 to a local edge switch 134. The local edge switch 134 passes the packets through an interconnect 154 to a third-party network 160 en route to a receiving client device 190. The sender 106 marks a subset of the packets for preferential treatment within the local network 110. However, the third-party network 160 is not expected to abide the preferential treatment markings. In some implementations, the edge switch 134 clears the preferential treatment markings, insuring that subsequent network devices will treat all packets of the flow in a similar manner.

Referring again to FIG. 2, the sender determines that a packet in the set of network packets was not received by the second computing device (stage 220), and determines if the non-received packet had been in the subset of packets marked by the sender for preferential treatment (stage 230). In some implementations, the sender determines that the packet was not received based on an amount of time that has elapsed without confirmation of receipt by the client device. For example, some implementations of the TCP protocol monitor average round-trip time (RTT) for packets within the flow and determine that a packet has been lost if not acknowledged within two times the average RTT. In some implementations, the sender is notified that the packet in the set of network packets was not received. For example, the sender may receive a control message from the receiver indicating that an unexpected packet was received, which would suggest that a previously sent packet was not delivered. In some implementations, the sender receives an explicit retransmission request.

The sender, responsive to determining that a packet was not received by the client, determines if the non-received packet had been in the subset of packets marked by the sender for preferential treatment (stage 230). In some implementations, the sender maintains status information for each packet transmitted until receipt is confirmed. The status information includes an indicator of whether the packet was marked for preferential treatment. In some implementations, the sender maintains status information only for packets marked for preferential treatment. In some implementations, the sender determines if a non-received packet was marked for preferential treatment based on a property of an identifier for the non-received packet, e.g., whether the sequence number satisfies a condition for marking the packet.

The non-received packet was lost somewhere in the networks between the sending device and the client device. Referring to FIG. 1, the non-received packet may have been lost within the sender's local network 110, or somewhere beyond the interconnect 154 between the sender's local network 110 and a third-party network 160 or client network 180. If the packet was lost outside of the local network 110, then the sender 106 may reduce the flow rate. Slowing down the flow rate reduces the number of packets that cross the interconnect 154 only to be lost on the external networks 160 and 180. If the packet was lost within the local network 110, there is no direct impact on data traversing the interconnect 154. The packets marked for preferential treatment within the local network are accorded priority by network devices in the local network over other packets. As a result, packets marked for preferential treatment are the least likely to be lost in the local network 110. However, the external networks 160 and 180 are not required to provide the same priority treatment, and may replace or ignore the preferential treatment markings. In some implementations, the local edge switch 134 removes the markings prior to transmitting packets to external networks. As a result, if a packet marked for preferential treatment is lost, it is more likely that the packet was lost on an external network where it was not provided preferential treatment. That is, loss of a preferred packet provides a location indicator for network problems such as network congestion.

Referring to FIG. 2, if the non-received packet was marked for preferential treatment, the sender reduces the flow rate for sending all of the packets in the flow (stage 240). Otherwise, if the non-received packet was not marked for preferential treatment, the sender simply resends the contents (the payload) of the non-received packet in stage 250 without modification to the flow rate. In some implementations, the flow rate has an initial value (e.g., a first number of packets or number of bytes that may be sent in a fixed timeframe) and the value is increased with each successful transmission until a maximum value is reached (e.g., a maximum buffer size at the receiver) or until a transmission failure occurs. For example, in some implementations, the value is doubled with each success. In some implementations, when there is a transmission failure, the flow rate is reset to the initial value. In some implementations, when there is a transmission failure, the flow rate is reduced either by a fixed amount or by a percentage (e.g., halved with each failure). In some implementations, the flow rate is only modified based on delivery or non-delivery of packets within the flow that are marked by the sender for preferential treatment. In some implementations, the flow rate is modified as a function of the number of packets marked for preferential treatment that were not received. In some implementations, the flow rate is reduced proportionally to the percentage of packets marked for preferential treatment. For example, if one out of ten packets in the flow are marked for preferential treatment (i.e., ten percent), then loss of one packet marked for preferential treatment is treated by the sender as though ten packets were lost. That is, the sender adjusts the flow rate as though ten packets have been lost for every one marked packet that is lost.

When a packet is not received (lost), the sender re-sends the information contained within the lost packet by adding a new packet to the flow with the undelivered payload of the lost packet (stage 250). The new packet is treated like any other packet of the flow. In some implementations, the new packet may be marked for preferential treatment, or not marked for preferential treatment, without regard to the marking of the lost packet.

In some implementations, the packets arrive at the receiver out of order. Packets marked for preferential treatment may pass through the local network faster, resulting in early delivery. If there is a problem within the local network, the packets marked for preferential treatment might not be impacted by the problem while the other packets in the flow might be lost and resent. For example, if the edge switch 134 (referring to FIG. 1) receives more traffic than its buffer can handle, it will prioritize packets marked for preferential treatment while dropping packets not marked for preferential treatment. In some implementations, TCP messages indicating out-of-order delivery are ignored. In some implementations, TCP messages indicating out-of-order delivery are also used to indicate that a packet is missing; in some such implementations, a packet is not treated as lost until the number of out-of-order delivery messages exceeds a threshold. In some implementations, the threshold is set high. In some implementations, the receiver is configured to send a specific retransmission request back to the sender if a necessary packet in the flow was not delivered. In some implementations, a transport protocol that tolerates out-of-order delivery is used.

FIG. 3 shows the format 310 for the headers of a typical TCP/IPv4 packet transmitted via Ethernet. In broad overview, the illustrated format includes an Ethernet frame 320, an Internet Protocol (IP) version 4 header 340, a transmission control protocol (TCP) header 370, and the beginning of the encapsulated data 390, i.e., the payload.

Referring to FIG. 3 in more detail, a TCP/IPv4 packet begins with a new packet preamble and delimiter, most of which is not shown. After the delimiter, an Ethernet frame header 320 includes a media access control (MAC) address for the packet's immediate destination (i.e., the network device receiving the packet) and a MAC address for the packet's immediate source (i.e., the network device transmitting the packet). A MAC address is 48 bits, or six 8-bit octets. The Ethernet frame header 320 also includes a 16-bit "Ethertype" indicator, which may indicate the size of the frame or the protocol for the Ethernet payload (i.e., the next level protocol). The Ethernet frame header 320 is followed by the Ethernet payload, which begins with a header for the encapsulated packet. This is illustrated in FIG. 3 as an IPv4 header 340. The first four bits of the IP header 340 indicate the Internet Protocol version (i.e., 4). The next sets of bits indicate the header length (IHL), six bits as flags for differentiated service requirements (DSCP), two bits for explicit congestion notification (ECN), a length for the IP packet, a packet identification shared across packet fragments, IP flags, and a fragment offset.

In some implementations, the DSCP field 336 is used to express quality of service (QoS) requirements. Network operators are not required to honor differentiated service requirements from other networks. Some networks clear the DSCP field 336 from packets entering the network at an edge switch. For example, referring to FIG. 1, the edge switch 164 for the carrier network 160 may be configured to set new values for the DSCP field 336 of packets entering the network 160. The new values may be set according to policies specific to the particular network 160. Referring back to FIG. 3, generally, within a network, the bits of the DSCP field 336 are used to prioritize packet processing. In some implementations, packets with particular bits set in the DSCP field 336 are given priority over other packets and are thus less likely to be dropped. The DSCP field is sometimes referred to in literature as the "DiffServ" field. IPv6 has a similar field known as "Traffic Class" bits.

Still referring to FIG. 3, after the packet fragmentation bits, the IPv4 header 340 indicates a time to live (TTL) for the packet, which may be measured in time (e.g., seconds) or hops (number of network devices that can forward the packet). After the TTL, the IPv4 header 340 indicates the protocol for the next level encapsulated packet. For example, a 1 indicates the Internet control message protocol (ICMP), a 6 indicates TCP, 17 indicates the user datagram protocol (UDP), and 132 indicates SCTP. The IPv4 header 340 further includes a header checksum, which must be recalculated every time the header changes, e.g., whenever the TTL is updated. The IPv4 header 340 next specifies a 32-bit source address and a 32-bit destination address. Additional header fields may be used, but may be omitted and are not shown in FIG. 3.

After the IPv4 header 340, FIG. 3 shows a TCP header 370. The typical TCP header begins with a 16-bit source port identifier and a 16-bit destination port identifier. A TCP port is a virtual port, typically used to indicate the type of data in the payload so that the receiver can pass the packet to the correct application. The TCP header 370 then specifies sequencing information including a sequence number for the packet, an acknowledgement number, and a data offset. The TCP header 370 includes control flags, e.g., SYN, FIN, and ACK, and additional control information such as the window size, a checksum, and other options. The data encapsulated 390 begins after the TCP header 370.

FIG. 4 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated example computing system 910 includes one or more processors 950 in communication, via a bus 915, with memory 970 and with at least one network interface controller 920 with a network interface 922 for connecting to external network devices 924, e.g., participating in a network (such as the networks 110, 160, and 180 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 910 may have any number of memory devices 970.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface port 922. The other computing device 924 may be a peer computing device, a network device, or any other computing device with network functionality. For example, a computing device 924 may be a network device such as a hub, a bridge, a switch, or a router, connecting the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method comprising:
    transmitting, by a first computing device in a first independent network controlled by a first network operator, to a second computing device in a second independent network different from the first independent network and controlled by a second network operator distinct from the first network operator, a set of network packets at a flow rate, wherein:
        the set of network packets constitutes a network flow associated with a single end-to-end network interaction over a TCP channel established between the first computing device and the second computing device, and
        the set of network packets constituting the network flow includes:
            a first subset of network packets not marked with a preferential treatment indicator, and
            a second subset of network packets marked with a preferential treatment indicator by the first computing device, wherein the second subset of network packets marked with the preferential treatment indicator are accorded priority by the first independent network but not the second independent network;
    determining, by the first computing device, that a transmitted network packet of the set of network packets did not reach the second computing device;
    responsive to determining that the transmitted network packet that did not reach the second computing device was in the first subset of network packets, maintaining the flow rate;
    responsive to determining that the transmitted network packet that did not reach the second computing device was in the second subset of network packets, modifying the flow rate;
    retransmitting, by the first computing device, to the second computing device, a payload of the transmitted network packet that did not reach the second computing device in a new network packet.

2. The method of claim 1, comprising:
    marking the network packets of the second subset of network packets with the preferential treatment indicator by setting an IPv4 Differentiated Services (DSCP) bit or an IPv6 Traffic Class bit.

3. The method of claim 1, comprising:
    selecting the second subset of network packets to be marked with the preferential treatment indicator by selecting a predetermined percentage of the network packets in the set of network packets.

4. The method of claim 1, comprising marking the new network packet with a preferential treatment indicator.

5. The method of claim 1, comprising not marking the new network packet with a preferential treatment indicator.

6. The method of claim 1, wherein modifying the flow rate responsive to determining that the transmitted network packet was in the second subset of network packets comprises slowing the flow rate proportionally to a percentage of network packets in the set of network packets marked for preferential treatment.

7. The method of claim 1, wherein transmitting the set of network packets comprises transmitting each network packet in the set of network packets to an intermediary network device at an edge of the first independent network.

8. The method of claim 7, comprising:
    removing, by the intermediary network device, the preferential treatment indicator from network packets in the second subset of network packets prior to transmitting the network packets of the second subset of network packets on a network egress link.

9. The method of claim 7, wherein the flow rate is higher than a bandwidth capacity for the intermediary network device.

10. A system comprising: a first computing device in a first independent network controlled by a first network operator, the first computing device configured to:
    transmit, to a second computing device in a second independent network different from the first independent network and controlled by a second network operator distinct from the first network operator, a set of network packets at a flow rate, wherein:
        the set of network packets constitutes a network flow for a single end-to-end network interaction over a TCP channel established between the first computing device and the second computing device, and
        the set of network packets constituting the network flow includes:
            a first subset of network packets not marked with a preferential treatment indicator, and
            a second subset of network packets marked with a preferential treatment indicator by the first computing device, wherein the second subset of network packets marked with the preferential treatment indicator are accorded priority by the first independent network but not the second independent network;
    determine that a transmitted network packet of the set of network packets did not reach the second computing device;
    responsive to determining that the transmitted network packet that did not reach the second computing device was in the first subset of network packets, maintain the flow rate;
    responsive to determining that the transmitted network packet that did not reach the second computing device was in the second subset of network packets, modify the flow rate;
    retransmit, to the second computing device, a payload of the transmitted network packet that did not reach the second computing device in a new network packet.

11. The system of claim 10, wherein the first computing device is configured to:

mark a packet with the preferential treatment indicator by setting an IPv4 Differentiated Services (DSCP) bit or an IPv6 Traffic Class bit.

12. The system of claim 10, wherein the first computing device is configured to:
select the second subset of network packets to be marked with the preferential treatment indicator by selecting a predetermined percentage of the network packets in the set of network packets.

13. The system of claim 10, wherein the first computing device is configured to mark the new network packet with a preferential treatment indicator.

14. The system of claim 10, wherein modifying the flow rate comprises slowing the flow rate proportionally to a percentage of network packets in the set of network packets marked for preferential treatment.

15. The system of claim 10, further comprising an intermediary network device at an edge of the first independent network, wherein:
the first computing device is configured to transmit the set of network packets by transmitting each network packet in the set of network packets to the intermediary network device.

16. The system of claim 15, wherein the intermediary device is configured to remove the preferential treatment indicator from network packets in the second subset of network packets prior to transmitting the network packets of the second subset of network packets on a network egress link.

17. The system of claim 15, wherein the intermediary network device uses a buffer with a capacity less than 10 milliseconds of traffic.

18. The system of claim 15, wherein the flow rate is higher than a bandwidth capacity for the intermediary network device.

19. The system of claim 10, wherein the first computing device is configured to not mark the new network packet with a preferential treatment indicator.

20. The method of claim 7, wherein the intermediary network device uses a buffer with a capacity less than 10 milliseconds of traffic.

* * * * *